US010839092B2

(12) United States Patent
Guillen

(10) Patent No.: US 10,839,092 B2
(45) Date of Patent: Nov. 17, 2020

(54) CLOUD STORAGE FOR ACCESS BY REMOTE SUBSCRIBERS

(71) Applicant: AT&T Intellectual Property I, L.P., Atlanta, GA (US)

(72) Inventor: Ludwin Guillen, Rancho Cucamonga, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 190 days.

(21) Appl. No.: 15/896,836

(22) Filed: Feb. 14, 2018

(65) Prior Publication Data
US 2019/0251277 A1 Aug. 15, 2019

(51) Int. Cl.
| | |
|---|---|
| *G06F 21/00* | (2013.01) |
| *G06F 21/62* | (2013.01) |
| *H04W 8/20* | (2009.01) |
| *H04W 12/06* | (2009.01) |
| *H04W 4/02* | (2018.01) |
| *G06F 21/60* | (2013.01) |

(Continued)

(52) U.S. Cl.
CPC ........ *G06F 21/6218* (2013.01); *G06F 21/604* (2013.01); *H04L 63/08* (2013.01); *H04W 4/02* (2013.01); *H04W 8/20* (2013.01); *H04W 12/06* (2013.01); *G06F 21/44* (2013.01); *H04L 63/10* (2013.01); *H04L 67/1097* (2013.01)

(58) Field of Classification Search
CPC ........ G06F 21/10; G06F 21/00; G06F 15/177; G06F 17/2235; G06F 17/2247; G06F 2221/0706; G06F 3/0481; G06F 13/20
See application file for complete search history.

(56) References Cited

U.S. PATENT DOCUMENTS

| | | |
|---|---|---|
| 9,141,982 B2 | 9/2015 | Van et al. |
| 9,307,274 B2 | 4/2016 | Kummere |

(Continued)

FOREIGN PATENT DOCUMENTS

| | | |
|---|---|---|
| EP | 3217674 A1 | 9/2017 |
| WO | 2017036568 A1 | 3/2017 |

OTHER PUBLICATIONS

"Your Cloud TV and DVR", http://www.freeair.tv:80 website, 2015, 4 pages.

(Continued)

*Primary Examiner* — Ghazal B Shehni
(74) *Attorney, Agent, or Firm* — Guntin & Gust, PLC; Jay Anderson

(57) ABSTRACT

Aspects of the subject disclosure may include, for example, a method in which storage assigned by a processing system to a subscriber of a network is remote from first and second subscriber devices. The system receives identifiers of content items that are stored at a storage device coupled to the processing system, stored at the equipment of the subscriber, or stored by a third-party content provider. The system obtains and stores the content items in the assigned storage; receives from the second subscriber device a request for the identifiers of the content items; and transmits the identifiers to the second subscriber device for display as a list of selectable items. The system receives a selection from the list and an instruction to initiate download of a selected content item at a third subscriber device associated with a different subscriber. Other embodiments are disclosed.

20 Claims, 10 Drawing Sheets

(51) Int. Cl.
  *H04L 29/06* (2006.01)
  *G06F 21/44* (2013.01)
  *H04L 29/08* (2006.01)

(56) References Cited

U.S. PATENT DOCUMENTS

| | | |
|---|---|---|
| 9,363,538 B2 | 6/2016 | Mccarthy |
| 9,462,317 B2 | 10/2016 | Thomas et al. |
| 9,479,804 B2 | 10/2016 | Mehta et al. |
| 9,667,918 B2 | 5/2017 | Bedingfield, Sr. et al. |
| 9,749,677 B2 | 8/2017 | Cholas et al. |
| 9,769,513 B2 | 9/2017 | Hasek |
| 2005/0210521 A1 | 9/2005 | Compton et al. |
| 2007/0094702 A1 | 4/2007 | Khare et al. |
| 2010/0319044 A1 | 12/2010 | Agans et al. |
| 2011/0038613 A1 | 2/2011 | Buchheit et al. |
| 2014/0037270 A1 | 2/2014 | Craner et al. |
| 2014/0150031 A1 | 5/2014 | Kumar et al. |
| 2014/0282786 A1 | 9/2014 | Lajoie et al. |
| 2015/0149528 A1* | 5/2015 | Miluzzo ............ H04L 67/1095 709/203 |
| 2016/0357737 A1* | 12/2016 | Oklota ................. G06F 16/438 |
| 2016/0371290 A1 | 12/2016 | Danovitz et al. |

OTHER PUBLICATIONS

Chaudhari, Jimshade, "Introducing new Cloud DVR channels, devices and features", https://whatson.sling.com website, Jun. 14, 2017, 5 pages.

\* cited by examiner

100

600

US 10,839,092 B2

CLOUD STORAGE FOR ACCESS BY REMOTE SUBSCRIBERS

FIELD OF THE DISCLOSURE

The subject disclosure relates to a system and method for providing cloud storage for a network subscriber to enable that subscriber to access content from a variety of locations.

BACKGROUND

Subscribers to a communication network often have multiple devices for accessing the network and obtaining content via the network from various sources. Typically at least one of the subscriber devices is a mobile device, so that the subscriber is able to enjoy content at a variety of locations.

BRIEF DESCRIPTION OF THE DRAWINGS

Reference will now be made to the accompanying drawings, which are not necessarily drawn to scale, and wherein.

DETAILED DESCRIPTION

Figure 1:
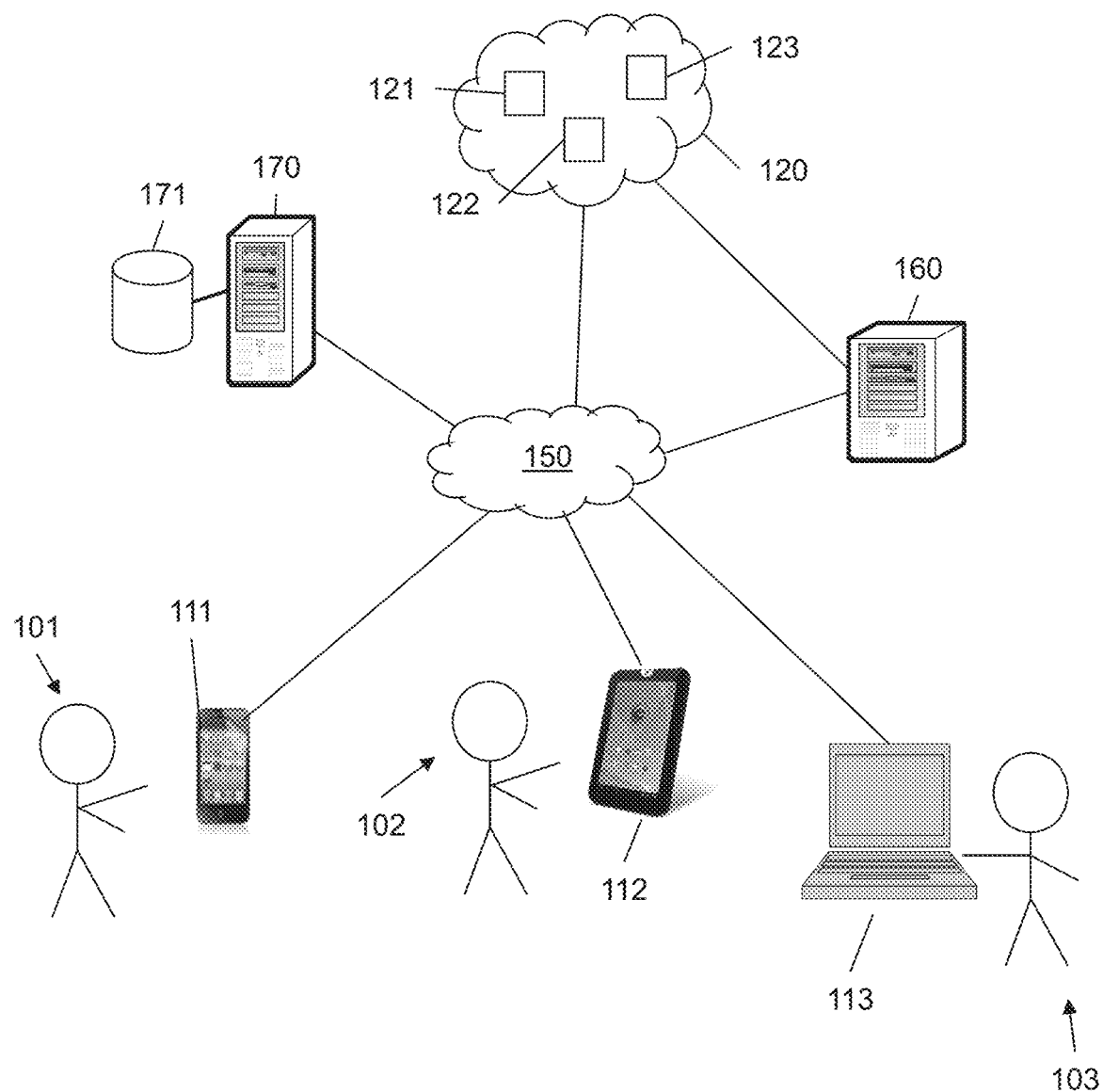
FIG. 1 schematically illustrates a communication network providing cloud storage to subscribers, in accordance with embodiments of the disclosure.

The subject disclosure describes, among other things, illustrative embodiments for a method and system in which a network subscriber uses mobile devices to upload content items to cloud storage and request a download of content items to another device. Other embodiments are described in the subject disclosure.

One or more aspects of the subject disclosure include a method in which a processing system provides storage that is assigned to a subscriber of a network; the assigned storage is remote from equipment of the subscriber, and the equipment of the subscriber includes a first subscriber device and a second subscriber device. The method also comprises receiving credentials from the first subscriber device to facilitate access to the assigned storage by the equipment of the subscriber, and receiving, from the first subscriber device, identifiers of content items. The content items comprise content accessible to the processing system via the network; the content is stored at a storage device coupled to the processing system, stored at the equipment of the subscriber, or stored by a third-party content provider in communication with the first subscriber device. The method also comprises obtaining the content items and storing the content items in the assigned storage. The method further comprises receiving, from the second subscriber device, a request for the identifiers of the content items, and transmitting the identifiers of the content items to the second subscriber device; the identifiers of the content items are displayed at the second subscriber device as a list of selectable items. The method also comprises receiving a message from the second subscriber device; the message comprises a selection from the list and an instruction to initiate a download of a content item corresponding to the selection at a third subscriber device. The method further comprises initiating the download of the content item to be presented at the third subscriber device.

One or more aspects of the subject disclosure include a device comprising a processing system including a processor, and a memory that stores executable instructions that, when executed by the processing system, facilitate performance of operations. The operations comprise providing assigned storage that is assigned to a subscriber of a network; the assigned storage is remote from equipment of the subscriber, and the equipment of the subscriber comprises a first subscriber device and a second subscriber device. The operations also comprise receiving, from the first subscriber device, identifiers of content items. The content items comprise content accessible to the processing system via the network; the content is stored at a storage device coupled to the processing system, stored at the equipment of the subscriber, or stored by a third-party content provider in communication with the first subscriber device. The operations also comprise obtaining the content items and storing the content items in the assigned storage. The operations also comprise receiving, from the second subscriber device, a request for the identifiers of the content items, and transmitting the identifiers of the content items to the second subscriber device; the identifiers of the content items are displayed at the second subscriber device as a list of selectable items. The operations also comprise receiving a message from the second subscriber device; the message comprises a selection from the list and an instruction to initiate a download of a content item corresponding to the selection at a third subscriber device. The operations further comprise initiating the download of the content item to be presented at the third subscriber device. According to this aspect of the disclosure, the assigned storage is assigned to a first subscriber, the third subscriber device is associated with a second subscriber to the network different from the first subscriber, and the first subscriber device and the third subscriber device are remote from each other.

One or more aspects of the subject disclosure include a machine-readable storage medium comprising executable instructions that, when executed by a processing system including a processor, facilitate performance of operations. The operations comprise providing assigned storage that is assigned to a subscriber of a network; the assigned storage is remote from equipment of the subscriber, and the equipment of the subscriber comprises a first subscriber device and a second subscriber device. The operations also comprise receiving, from the first subscriber device, identifiers of content items. The content items comprise content accessible to the processing system via the network; the content is stored at a storage device coupled to the processing system, stored at the equipment of the subscriber, or stored by a third-party content provider in communication with the first subscriber device. The operations also comprise obtaining the content items and storing the content items in the assigned storage. The operations also comprise receiving, from the second subscriber device, a request for the identifiers of the content items, and transmitting the identifiers of the content items to the second subscriber device; the identifiers of the content items are displayed at the second subscriber device as a list of selectable items. The operations also comprise receiving a message from the second subscriber device; the message comprises a selection from the list and an instruction to initiate a download of a content item corresponding to the selection at a third subscriber device. The operations further comprise initiating the download of the content item to be presented at the third subscriber device.

FIG. 1 depicts an illustrative embodiment 100 of a communication network providing cloud storage to subscribers of that network. As shown in FIG. 1, cloud storage 120 can be maintained by a system administrator (shown in FIG. 1 as executing on a server 160) and can be accessible to devices belonging to subscribers 101-103. In this example, subscribers 101-103 respectively use a mobile phone 111, a mobile tablet 112, and a personal computer 113. The system administrator assigns cloud storage 121, 122, 123 to the respective subscribers. The storage for a given subscriber can be assigned to and associated with the subscriber, independent of the device used by the subscriber. In this embodiment, storage 122 assigned to subscriber 102 is tagged with an identifier for subscriber 102, who can use various devices to access storage 122 in addition to tablet 112.

As shown in FIG. 1, storage 120 is accessed by the subscribers via a public network 150 (e.g. the Internet). Subscribers 101-103 can also use network 150 to communicate with a third-party provider 170 of content (typically audiovisual content) stored at a storage facility 171. In this embodiment, content provider 170 is separate from the system administrator. The system administrator can also provide content, either stored at a storage facility coupled to server 160 or in cloud storage.

Figure 2:
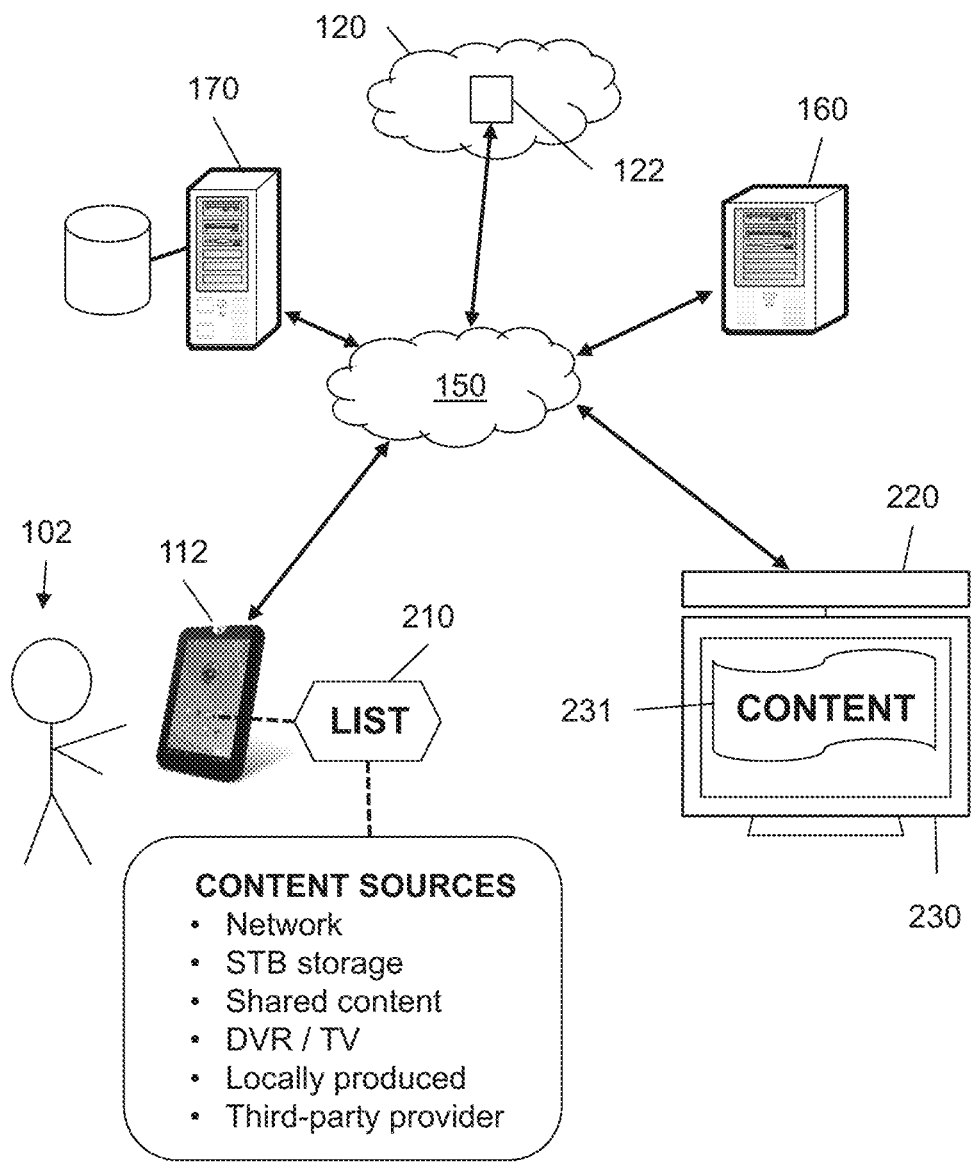
FIG. 2 schematically illustrates a procedure for uploading content from a mobile device to cloud storage and downloading content to a different device, in accordance with embodiments of the disclosure.

FIG. 2 schematically illustrates a procedure 200 for uploading content from a mobile device to cloud storage and downloading content to a different device, in accordance with embodiments of the disclosure. In an embodiment, subscriber 102 uses tablet 112 to view a list 210 of content items and select one or more items to be uploaded to cloud storage 122.

The list may be provided by the system administrator, offering content in accordance with a subscription plan of subscriber 102. The list may also include content already stored at equipment of subscriber 102, whether or not it is available from the system administrator. For example, the subscriber may have in his/her residence a set-top box (STB) 220, connected to a display device 230 for presenting content 231. The STB can include local storage for content previously downloaded via the network; for content produced by other subscribers and then shared with subscriber 102; for content locally recorded, e.g. using a digital video recorder (DVR) to record a live television program; and for content locally produced (e.g. by a video camera operated by subscriber 102).

In an embodiment, the list 210 can also include identifiers of content items available from third-party content provider 170. For example, subscriber 102 may access a website of content provider 170 and select content offerings therefrom.

In this embodiment, list 210 is assembled using a processor of tablet 112, and includes identifiers of content from several different sources. It will be appreciated that listed content items need not have actually been obtained by subscriber 102, be stored at equipment of the subscriber 102, or be viewed by the subscriber.

The list 210 of content items is transmitted to the system administrator, which obtains the content and uploads the content to cloud storage 122 assigned to subscriber 102. Alternatively, subscriber 102 can control STB 220 to transmit content stored therein to cloud storage 122 via public network 150.

Figure 3:
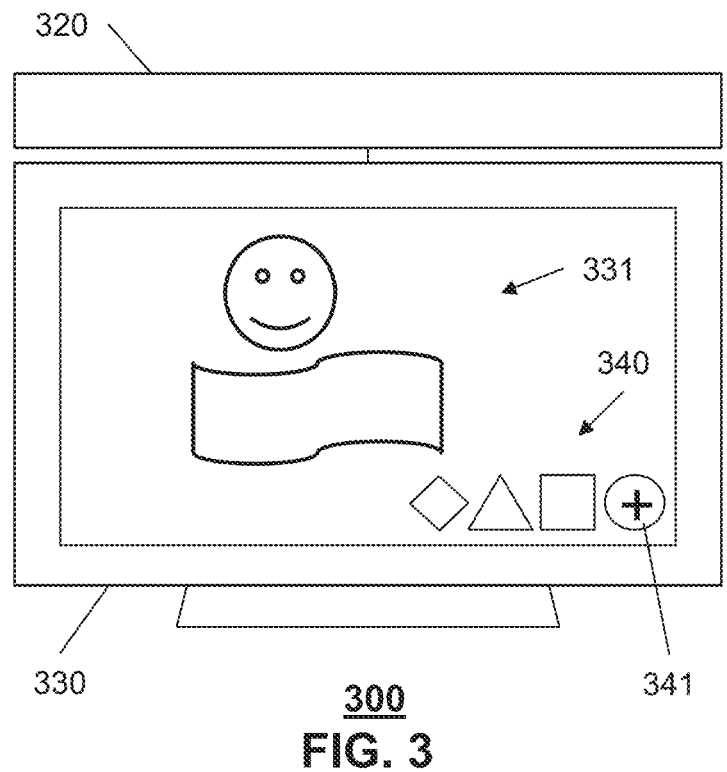
FIGS. 3-4 schematically illustrate selecting and downloading content for viewing at a display device, in accordance with embodiments of the disclosure.

In another embodiment, list 210 displayed on tablet 112 has identifiers of the content items currently stored in cloud storage 122. The subscriber 102 can use tablet 112 to select one or more content items for download and presentation at a subscriber device. In this embodiment, subscriber 103 can send a message to the system administrator, specifying the desired content item(s). The system administrator then retrieves the content item from storage 122 and delivers the content item to a subscriber device for presentation. As shown in FIG. 3, subscriber 102 using tablet 112 can direct the system administrator to deliver the content item to STB 220, which can then present the content on the display 230.

It will be appreciated that the subscriber device specifying the download (e.g. tablet 112) and the subscriber device receiving the content (e.g. STB 220) need not be at the same location. In a further embodiment, the device receiving the content and the device used to specify the download can belong to different subscribers (where, for example, the subscribers have an agreement in place to share content). In this instance, subscriber 102 sends additional information including an identifier of the other subscriber and an identifier of the device receiving the content. The system administrator can check its database of subscribers to confirm the sharing agreement.

Figure 4:
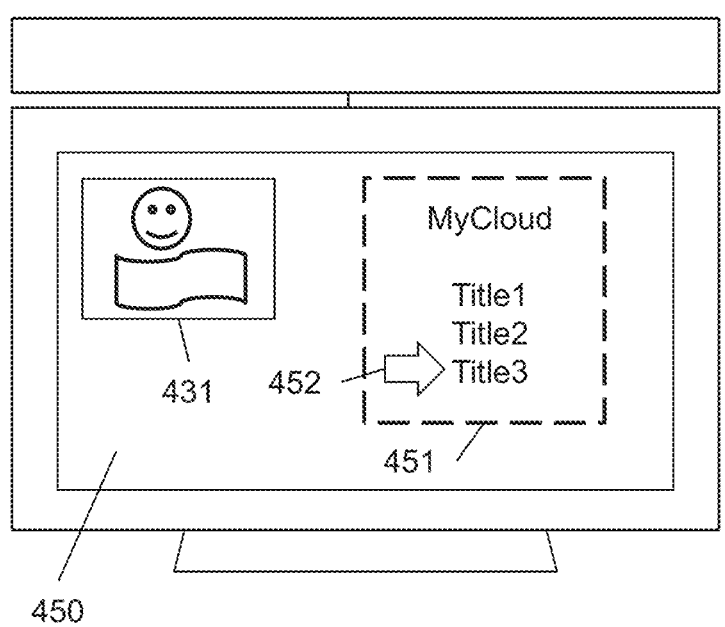

FIGS. 3 and 4 schematically illustrate selecting and downloading content from cloud storage for viewing at a display device not controlled by a network subscriber (for example, a television with STB at a hotel), in accordance with embodiments of the disclosure. FIG. 3 shows an arrangement 300 including STB 320 that can connect to the Internet; STB 320 is coupled to display device 330 displaying content 331. In this embodiment, selectable icons 340 are displayed at device 330, enabling a user of the device to access the internet and then access his/her cloud storage, for example by selecting icon 341.

As shown in arrangement 400 of FIG. 4, selection of icon 341 can cause a new display 450 to appear; a portion of the screen continues to show the current content as a picture-in-picture 431, while another portion of the screen 451 displays a page for logging in to the cloud storage system ("MyCloud") and, after a successful login procedure, a menu of the user's stored content items. The user can then select a content item for download to STB 320 for presentation at display 330 by moving cursor 452 to point to the desired title. In this embodiment, movement of cursor 452 can be controlled via a remote control device of the STB.

Figure 5:
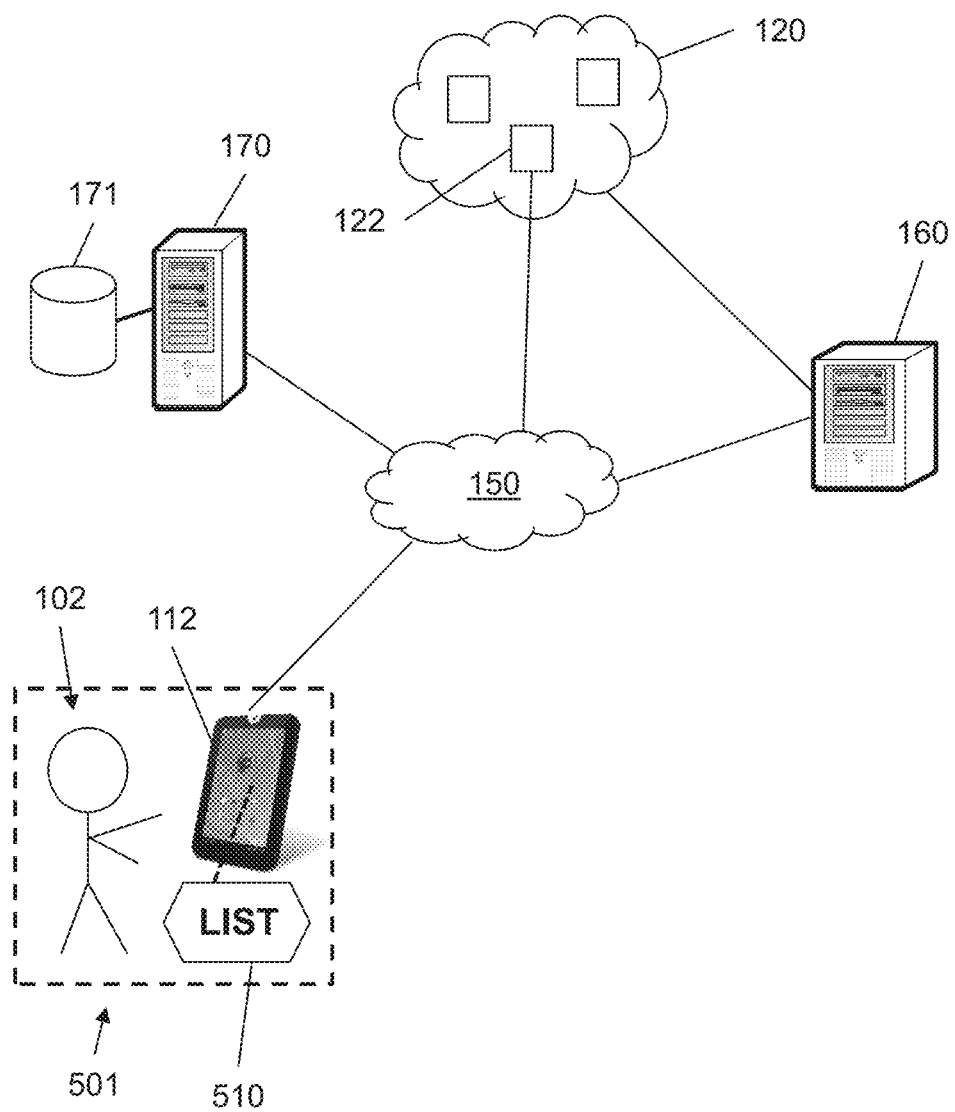
FIG. 5 schematically illustrates a procedure in which a subscriber uploads content to cloud storage while at a first location, in accordance with an embodiment of the disclosure.

FIG. 5 schematically illustrates a procedure 500 in which a subscriber uploads content to cloud storage while at a first location, in accordance with an embodiment of the disclosure. In this embodiment, network subscriber 102 is located at his/her residence 501, and uses tablet 112 to compile a list 510 of content items to be uploaded to the subscriber's assigned cloud storage 122. The content items may be at a variety of locations, including storage controlled by the system administrator 160; storage controlled by a third-party content provider 170; and storage at a subscriber device. In this embodiment, the subscriber 102 needs only to identify the content items desired for upload; the subscriber does not need to obtain, store or view the content. In the case of content stored locally (e.g. a STB at residence 501), the subscriber can upload the content to storage 122 via the public network 150.

Figure 6:
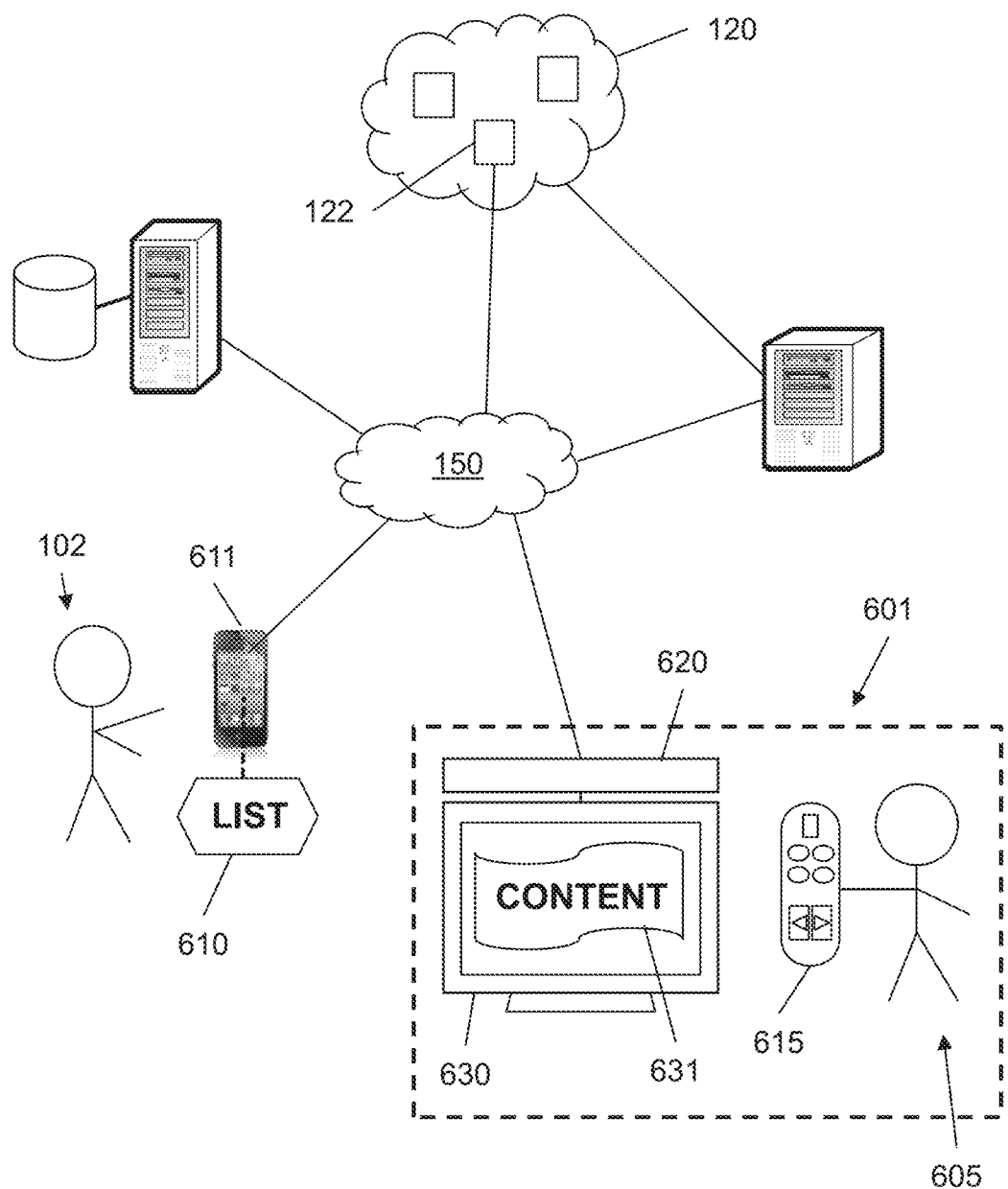
FIG. 6 schematically illustrates a procedure in which the subscriber of FIG. 5, while using a mobile device, facilitates a download of content at a second location, in accordance with an embodiment of the disclosure.

FIG. 6 schematically illustrates a procedure 600 in which subscriber 102, having ordered an upload at a first location as shown in FIG. 5, facilitates a download of content at a second location. A network subscriber can use a device to request a download that is different from the device used to order the upload. As shown in FIG. 6, subscriber 102 uses mobile phone 611 and may be remote from his/her residence 501. Subscriber 102 can request a download of content from cloud storage 122 to another device, also remote from residence 501 and remote from mobile phone 611.

In this embodiment, the device (target device) selected to receive the downloaded content is located at residence 601 of network subscriber 605. In this example, the target device is a STB 620 that can display content 631 at a display device 630.

Subscriber 102 can view a list 610 of content items presently stored in cloud storage 122, and select one or more content items for download to STB 620 for presentation at display 630. A person at residence 601 (e.g. network subscriber 605, using remote control device 615 for the STB) can then view the content. In this embodiment, the STB 620 is recognized by the system administrator as the target device, but does not need to be logged in to the network.

Before performing the download of the requested content, the system administrator can determine the capabilities of the target device, and reformat the content accordingly.

The devices used to order an upload of content (originating device), to request a download of content (requesting device), and to receive downloaded content (target device) can be different devices. Furthermore, a subscriber associated with the target device does not need to access the MyCloud storage, but rather receives the content via the network from the system administrator (which decrypts the content if necessary). Accordingly, the subscriber associated with the target device can be different from the subscriber associated with the originating and requesting devices. It will be appreciated that storage of content in assigned cloud storage can be independent of device type, device location, content type, or content origin.

Figure 7:
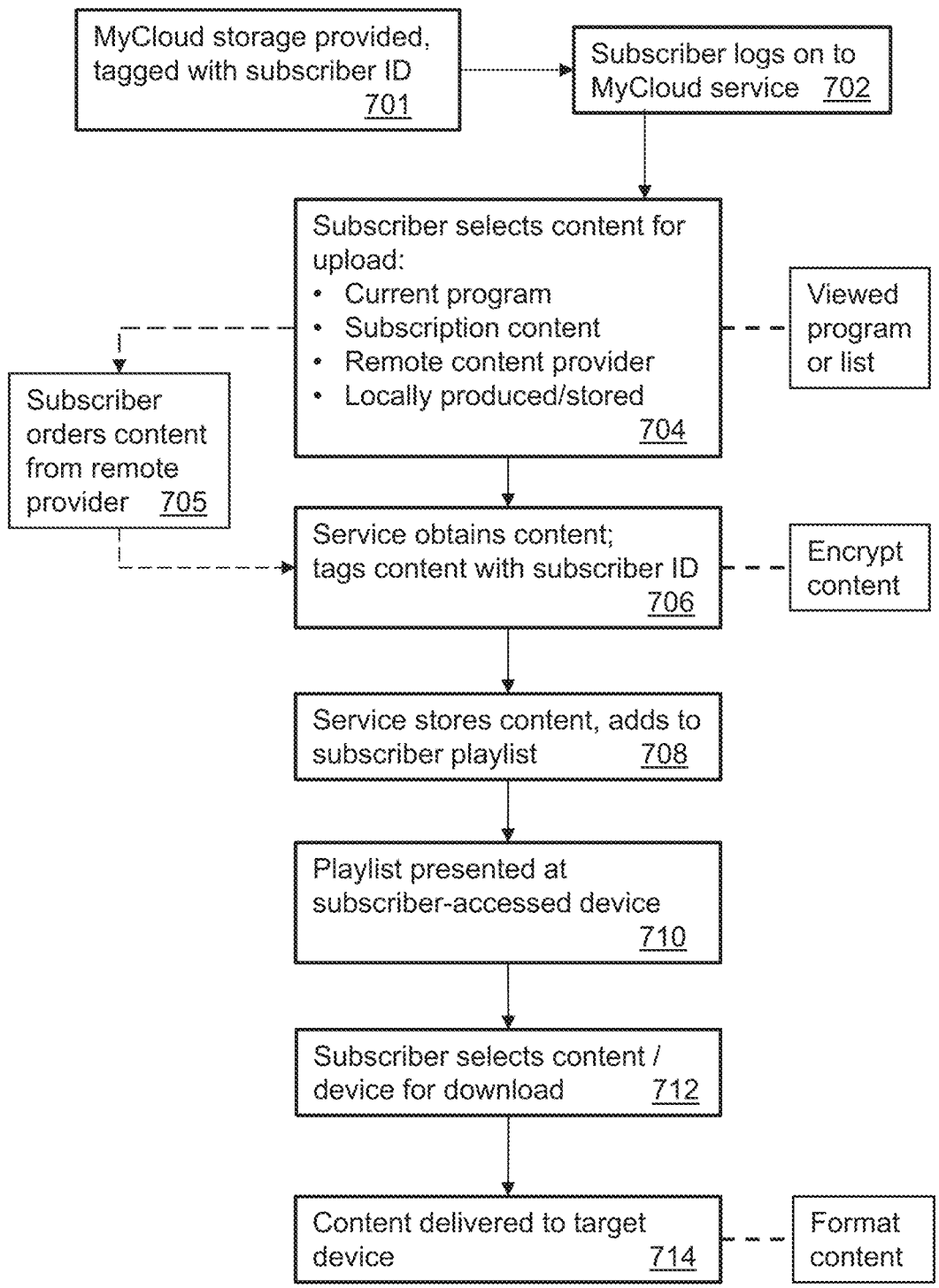
FIG. 7 depicts an illustrative embodiment of a method used in portions of the systems of FIGS. 1-6.

FIG. 7 depicts an illustrative embodiment of a method 700 used in portions of the systems of FIGS. 1-6. In step 701, the system administrator assigns "MyCloud" storage to a network subscriber and associates that storage with an identifier of the subscriber. The subscriber transmits credentials from his/her device to the system administrator to log in to the storage service (step 702); in an embodiment, this may be done by the subscriber logging in to the network, and then selecting "MyCloud" on a webpage presented by the administrator.

The subscriber then selects content for uploading to the cloud storage (step 704). As noted above, the content may have a variety of sources, including the subscriber's own digital video recorder (DVR). The subscriber may also specify content offered by a third-party provider (step 705). The system administrator obtains the selected content items (step 706) and uploads the items to the subscriber's assigned cloud storage (step 708). In an embodiment, the content may be stored in an encrypted form. The system administrator also maintains a list of identifiers of the stored content (the subscriber's playlist).

The system administrator presents the updated playlist at a subscriber device (step 710). The subscriber can then select content to be downloaded from the cloud storage, and may also specify a device to receive the content (step 712). The system administrator can format the content according to the capabilities of the target device, and then delivers the content to the target device (step 714). In an embodiment, the system administrator obtains information regarding those capabilities in response to an alert, transmitted to the target device, that the download is to be performed.

While for purposes of simplicity of explanation, the respective processes are shown and described as a series of blocks in FIG. 7, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 8:
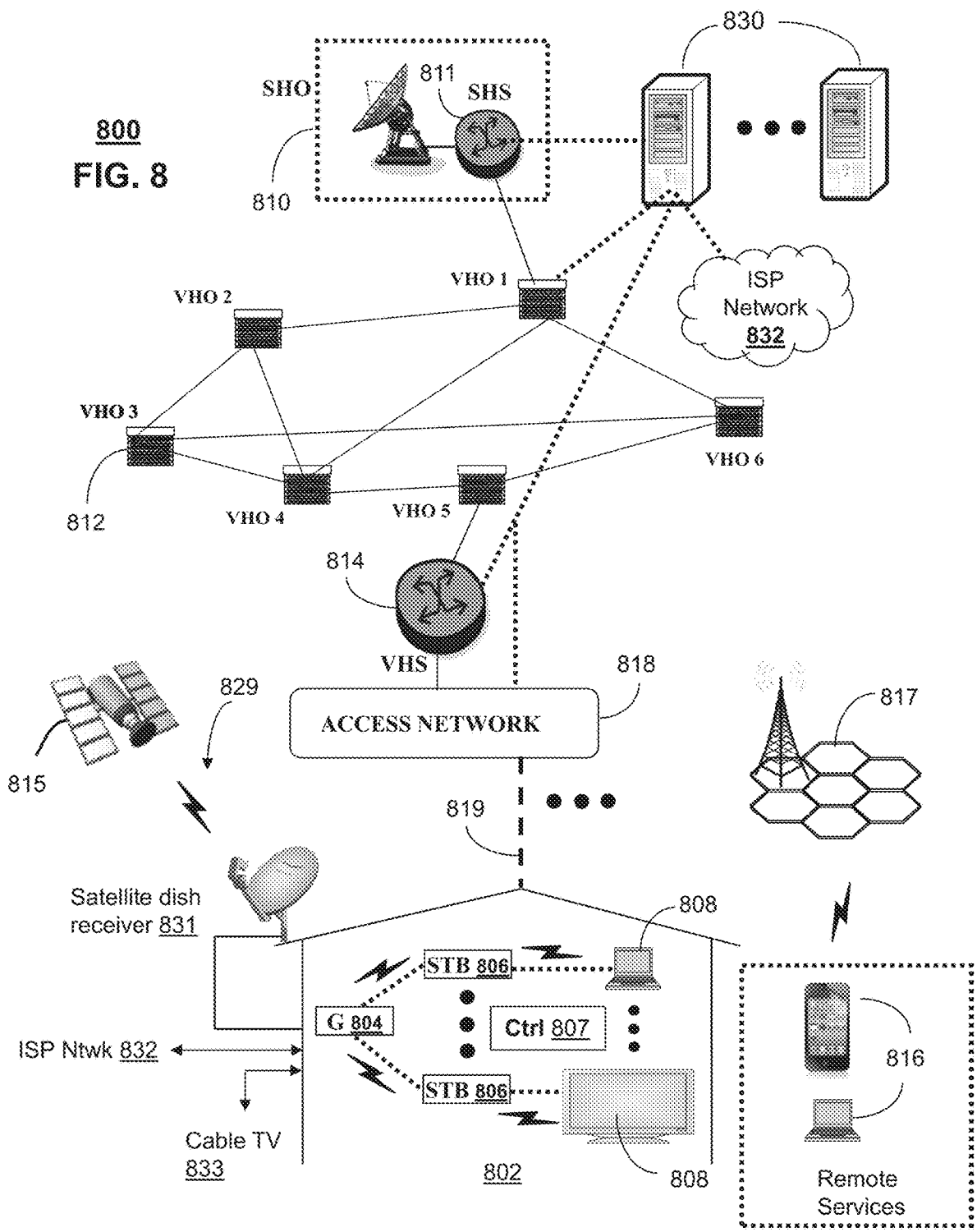
FIGS. 8-9 depict illustrative embodiments of communication systems that provide media services to the systems of FIGS. 1-2.

FIG. 8 depicts an illustrative embodiment of a communication system 800 for providing various communication services, such as delivering media content. The communication system 800 can represent an interactive media network, such as an interactive television system (e.g., an Internet Protocol Television (IPTV) media system). Communication system 800 can be overlaid or operably coupled with the systems of FIGS. 1-6 as another representative embodiment of communication system 800. For instance, one or more devices illustrated in the communication system 800 of FIG. 8 can include a processing system including a processor, and a memory that stores executable instructions that, when executed by the processing system, facilitate performance of operations. The operations can comprise providing assigned storage that is assigned to a subscriber of a network; the assigned storage is remote from equipment of the subscriber, and the equipment of the subscriber comprises a first subscriber device and a second subscriber device. The operations can also comprise receiving, from the first subscriber device, identifiers of content items. The content items can comprise content accessible to the processing system via the network; the content is stored at a storage device coupled to the processing system, stored at the equipment of the subscriber, or stored by a third-party content provider in communication with the first subscriber device. The operations can also comprise obtaining the content items and storing the content items in the assigned storage. The operations can also comprise receiving, from the second subscriber device, a request for the identifiers of the content items, and transmitting the identifiers of the content items to the second subscriber device; the identifiers of the content items are displayed at the second subscriber device as a list of selectable items. The operations can also comprise receiving a message from the second subscriber device; the message comprises a selection from the list and an instruction to initiate a download of a content item corresponding to the selection at a third subscriber device. The operations can further comprise initiating the download of the content item to be presented at the third subscriber device. In addition, the assigned storage can be assigned to a first subscriber, and the third subscriber device can be associated with a second subscriber to the network different from the first subscriber, with the first subscriber device and the third subscriber device being remote from each other.

In one or more embodiments, the communication system 800 can include a super head-end office (SHO) 810 with at least one super headend office server (SHS) 811 which receives media content from satellite and/or terrestrial communication systems. In the present context, media content can represent, for example, audio content, moving image content such as 2D or 3D videos, video games, virtual reality content, still image content, and combinations thereof. The SHS server 811 can forward packets associated with the media content to one or more video head-end servers (VHS) 814 via a network of video head-end offices (VHO) 812 according to a multicast communication protocol. The VHS 814 can distribute multimedia broadcast content via an access network 818 to commercial and/or residential buildings 802 housing a gateway 804 (such as a residential or commercial gateway).

The access network 818 can represent a group of digital subscriber line access multiplexers (DSLAMs) located in a central office or a service area interface that provide broadband services over fiber optical links or copper twisted pairs 819 to buildings 802. The gateway 804 can use communication technology to distribute broadcast signals to media processors 806 such as Set-Top Boxes (STBs) which in turn present broadcast channels to media devices 808 such as computers or television sets managed in some instances by a media controller 807 (such as an infrared or RF remote controller).

The gateway 804, the media processors 806, and media devices 808 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 806 and subsystems of the IPTV media system for services such as video-on-demand (VoD), browsing an electronic programming guide (EPG), or other infrastructure services.

A satellite broadcast television system 829 can be used in the media system of FIG. 8. The satellite broadcast television system can be overlaid, operably coupled with, or replace the IPTV system as another representative embodiment of communication system 800. In this embodiment, signals transmitted by a satellite 815 that include media content can be received by a satellite dish receiver 831 coupled to the building 802. Modulated signals received by the satellite dish receiver 831 can be transferred to the media processors 806 for demodulating, decoding, encoding, and/or distributing broadcast channels to the media devices 808. The media processors 806 can be equipped with a broadband port to an Internet Service Provider (ISP) network 832 to enable interactive services such as VoD and EPG as described above.

In yet another embodiment, an analog or digital cable broadcast distribution system such as cable TV system 833 can be overlaid, operably coupled with, or replace the IPTV system and/or the satellite TV system as another representative embodiment of communication system 800. In this embodiment, the cable TV system 833 can also provide Internet, telephony, and interactive media services. System 800 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 830, a portion of which can operate as a web server for providing web portal services over the ISP network 832 to wireline media devices 808 or wireless communication devices 816.

Communication system 800 can also provide for all or a portion of the computing devices 830 to function as a server (herein referred to as server 830). The server 830 can use computing and communication technology to perform uploading/storing, downloading/retrieval, and playlist maintenance, which can include among other things, the techniques described by method 700 of FIG. 7. For instance, functions of server 830 can be similar to the functions described for server 160 of FIGS. 1, 2, 5 and 6 in accordance with method 700. The media processors 806 and wireless communication devices 816 can be provisioned with software functions to utilize the services of server 830. For instance, functions of media processors 806 and wireless communication devices 816 can be similar to the functions described for the devices 111-113 of FIG. 1 in accordance with method 700.

Multiple forms of media services can be offered to media devices over landline technologies such as those described above. Additionally, media services can be offered to media devices by way of a wireless access base station 817 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 9:
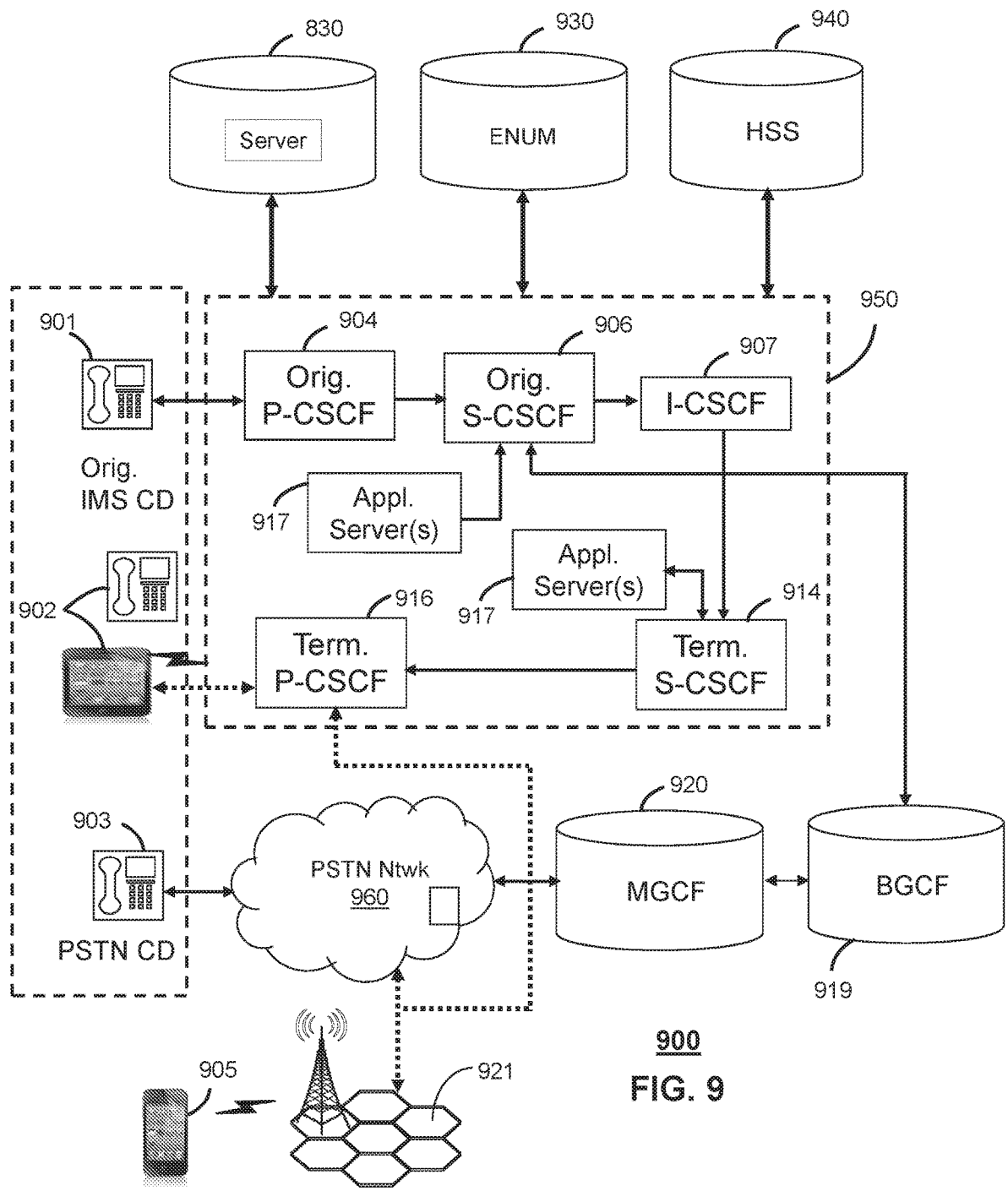

FIG. 9 depicts an illustrative embodiment of a communication system 900 employing an IP Multimedia Subsystem (IMS) network architecture to facilitate the combined services of circuit-switched and packet-switched systems. Communication system 900 can be overlaid or operably coupled with systems shown in FIGS. 1 and/or 2 and communication system 800 as another representative embodiment of communication system 800. In particular, the system can include a processing system performing a method in which the processing system provides storage that is assigned to a subscriber of a network; the assigned storage is remote from equipment of the subscriber, and the equipment of the subscriber includes a first subscriber device and a second subscriber device. The method can also comprise receiving credentials from the first subscriber device to facilitate access to the assigned storage by the equipment of the subscriber, and receiving, from the first subscriber device, identifiers of content items. The content items can comprise content accessible to the processing system via the network; the content can be stored at a storage device coupled to the processing system, stored at the equipment of the subscriber, or stored by a third-party content provider in communication with the first subscriber device. The method can also comprise obtaining the content items and storing the content items in the assigned storage. The method can further comprise receiving, from the second subscriber device, a request for the identifiers of the content items, and transmitting the identifiers of the content items to the second subscriber device; the identifiers of the content items are displayed at the second subscriber device as a list of selectable items. The method can also comprise receiving a message from the second subscriber device; the message comprises a selection from the list and an instruction to initiate a download of a content item corresponding to the selection at a third subscriber device. The method can further comprise initiating the download of the content item to be presented at the third subscriber device.

Communication system 900 can comprise a Home Subscriber Server (HSS) 940, a tElephone NUmber Mapping (ENUM) server 930, and other network elements of an IMS network 950. The IMS network 950 can establish communications between IMS-compliant communication devices (CDs) 901, 902, Public Switched Telephone Network (PSTN) CDs 903, 905, and combinations thereof by way of a Media Gateway Control Function (MGCF) 920 coupled to a PSTN network 960. The MGCF 920 need not be used when a communication session involves IMS CD to IMS CD communications. A communication session involving at least one PSTN CD may utilize the MGCF 920.

IMS CDs 901, 902 can register with the IMS network 950 by contacting a Proxy Call Session Control Function (P-CSCF) which communicates with an interrogating CSCF (I-CSCF), which in turn, communicates with a Serving CSCF (S-CSCF) to register the CDs with the HSS 940. To initiate a communication session between CDs, an originating IMS CD 901 can submit a Session Initiation Protocol (SIP INVITE) message to an originating P-CSCF 904 which communicates with a corresponding originating S-CSCF 906. The originating S-CSCF 906 can submit the SIP INVITE message to one or more application servers (ASs) 917 that can provide a variety of services to IMS subscribers.

For example, the application servers 917 can be used to perform originating call feature treatment functions on the calling party number received by the originating S-CSCF 906 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 906 can submit queries to the ENUM system 930 to translate an E.164 telephone number in the SIP INVITE message to a SIP Uniform Resource Identifier (URI) if the terminating communication device is IMS-compliant. The SIP URI can be used by an Interrogating CSCF (I-CSCF) 907 to submit a query to the HSS 940 to identify a terminating S-CSCF 914 associated with a terminating IMS CD such as reference 902. Once identified, the I-CSCF 907 can submit the SIP INVITE message to the terminating S-CSCF 914. The terminating S-CSCF 914 can then identify a terminating P-CSCF 916 associated with the terminating CD 902. The P-CSCF 916 may then signal the CD 902 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 9 may be interchangeable. It is further noted that communication system 900 can be adapted to support video conferencing. In addition, communication system 900 can be adapted to provide the IMS CDs 901, 902 with the multimedia and Internet services of communication system 800 of FIG. 8.

If the terminating communication device is instead a PSTN CD such as CD 903 or CD 905 (in instances where the cellular phone only supports circuit-switched voice communications), the ENUM system 930 can respond with an unsuccessful address resolution which can cause the originating S-CSCF 906 to forward the call to the MGCF 920 via a Breakout Gateway Control Function (BGCF) 919. The MGCF 920 can then initiate the call to the terminating PSTN CD over the PSTN network 960 to enable the calling and called parties to engage in voice and/or data communications.

It is further appreciated that the CDs of FIG. 9 can operate as wireline or wireless devices. For example, the CDs of FIG. 9 can be communicatively coupled to a cellular base station 921, a femtocell, a WiFi router, a Digital Enhanced Cordless Telecommunications (DECT) base unit, or another suitable wireless access unit to establish communications with the IMS network 950 of FIG. 9. The cellular access base station 921 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 9.

Cellular phones supporting LTE can support packet-switched voice and packet-switched data communications and thus may operate as IMS-compliant mobile devices. In this embodiment, the cellular base station 921 may communicate directly with the IMS network 950 as shown by the arrow connecting the cellular base station 921 and the P-CSCF 916.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 830 of FIG. 8 can be operably coupled to communication system 900 for purposes similar to those described above. Server 830 can perform content uploading and downloading functions and thereby provide services to the CDs 901, 902, 903 and 905 of FIG. 9 similar to the functions described in accordance with method 700 of FIG. 7. CDs 901, 902, 903 and 905 can be adapted with software to perform functions to utilize the services of the server 830 similar to the functions described for communication devices 111-113 of FIG. 1, in accordance with method 700 of FIG. 7. Server 830 can be an integral part of the application server(s) 917, which can be adapted to the operations of the IMS network 950.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 10:
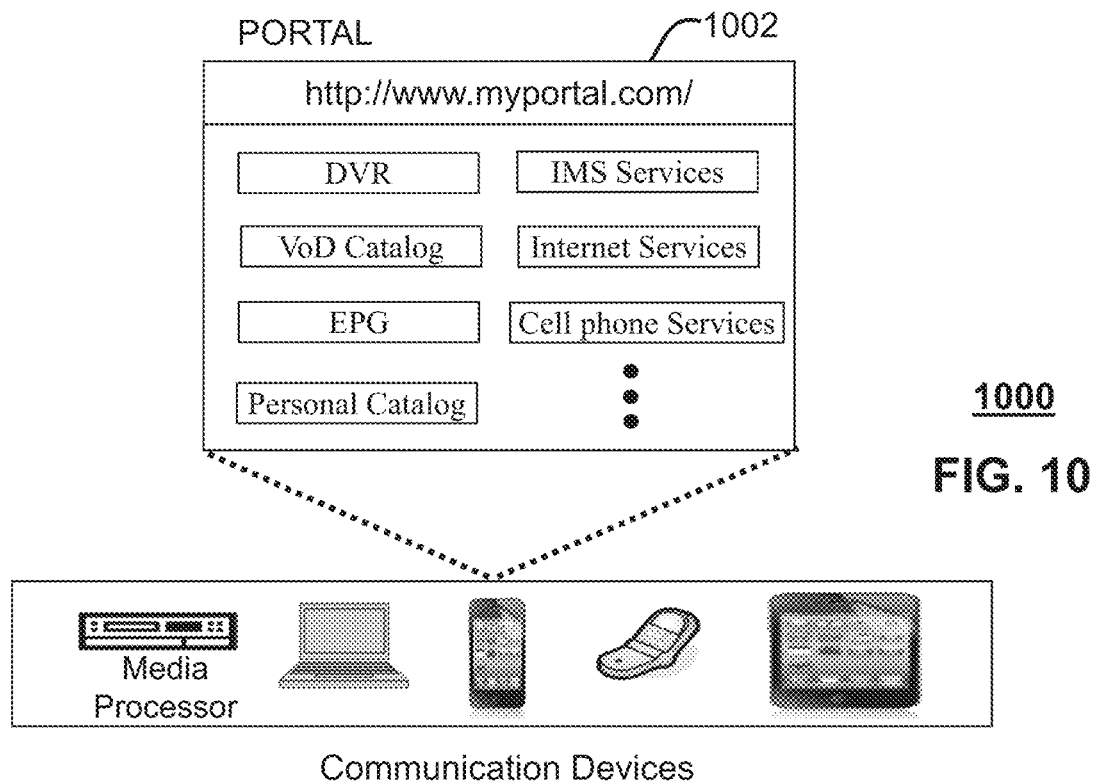
FIG. 10 depicts an illustrative embodiment of a web portal for interacting with the communication systems of FIGS. 1-2, and 8-9.

FIG. 10 depicts an illustrative embodiment of a web portal 1002 of a communication system 1000. Communication system 1000 can be overlaid or operably coupled with systems of FIGS. 1, 2, 5 and 6, communication system 800, and/or communication system 900 as another representative embodiment of systems of FIGS. 1, 2, 5 and 6, communication system 800, and/or communication system 900. The web portal 1002 can be used for managing services of systems of FIGS. 1, 2, 5 and 6, and communication systems 800-900. A web page of the web portal 1002 can be accessed by a Uniform Resource Locator (URL) with an Internet browser using an Internet-capable communication device such as those described in FIGS. 1 and/or 2 and FIGS. 8-9. The web portal 1002 can be configured, for example, to access a media processor 806 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 806. The web portal 1002 can also be used for provisioning IMS services described earlier, provisioning Internet services, provisioning cellular phone services, and so on.

The web portal 1002 can further be utilized to manage and provision software applications to adapt these applications as may be desired by subscribers and/or service providers of systems of FIGS. 1, 5 and 6, and communication systems 800-900. For instance, users of the services provided by server 160 or server 830 can log into their on-line accounts and provision the servers 160 or server 830 with user profiles, contact information to enable it to communicate with devices described in FIGS. 1-6, and so on. Service providers can log onto an administrator account to provision, monitor and/or maintain the systems of FIGS. 1 and/or 2 or server 830.

Figure 11:
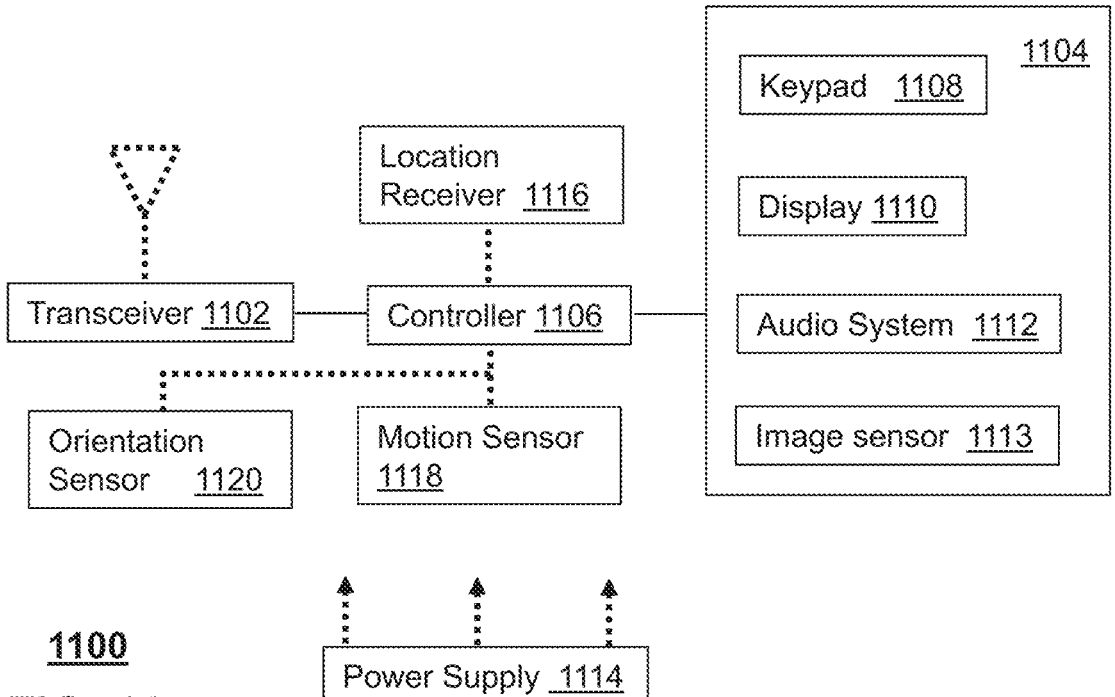
FIG. 11 depicts an illustrative embodiment of a communication device.

FIG. 11 depicts an illustrative embodiment of a communication device 1100. Communication device 1100 can serve in whole or in part as an illustrative embodiment of the devices depicted in FIGS. 1-6 and FIGS. 8-9 and can be configured to perform portions of method 700 of FIG. 7.

Communication device 1100 can comprise a wireline and/or wireless transceiver 1102 (herein transceiver 1102), a user interface (UI) 1104, a power supply 1114, a location receiver 1116, a motion sensor 1118, an orientation sensor 1120, and a controller 1106 for managing operations thereof. The transceiver 1102 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1102 can also be adapted to support circuit-switched wireline access technologies (such as PSTN), packet-switched wireline access technologies (such as TCP/IP, VoIP, etc.), and combinations thereof.

The UI 1104 can include a depressible or touch-sensitive keypad 1108 with a navigation mechanism such as a roller ball, a joystick, a mouse, or a navigation disk for manipulating operations of the communication device 1100. The keypad 1108 can be an integral part of a housing assembly of the communication device 1100 or an independent device operably coupled thereto by a tethered wireline interface (such as a USB cable) or a wireless interface supporting for example Bluetooth®. The keypad 1108 can represent a numeric keypad commonly used by phones, and/or a QWERTY keypad with alphanumeric keys. The UI 1104 can further include a display 1110 such as monochrome or color LCD (Liquid Crystal Display), OLED (Organic Light Emitting Diode) or other suitable display technology for conveying images to an end user of the communication device 1100. In an embodiment where the display 1110 is touch-sensitive, a portion or all of the keypad 1108 can be presented by way of the display 1110 with navigation features.

The display 1110 can use touch screen technology to also serve as a user interface for detecting user input. As a touch screen display, the communication device 1100 can be adapted to present a user interface with graphical user interface (GUI) elements that can be selected by a user with a touch of a finger. The touch screen display 1110 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1110 can be an integral part of the housing assembly of the communication device 1100 or an independent device communicatively coupled thereto by a tethered wireline interface (such as a cable) or a wireless interface.

The UI 1104 can also include an audio system 1112 that utilizes audio technology for conveying low volume audio (such as audio heard in proximity of a human ear) and high volume audio (such as speakerphone for hands free operation). The audio system 1112 can further include a microphone for receiving audible signals of an end user. The audio system 1112 can also be used for voice recognition applications. The UI 1104 can further include an image sensor 1113 such as a charged coupled device (CCD) camera for capturing still or moving images.

The power supply 1114 can utilize common power management technologies such as replaceable and rechargeable batteries, supply regulation technologies, and/or charging system technologies for supplying energy to the components of the communication device 1100 to facilitate long-range or short-range portable applications. Alternatively, or in combination, the charging system can utilize external power sources such as DC power supplied over a physical interface such as a USB port or other suitable tethering technologies.

The location receiver 1116 can utilize location technology such as a global positioning system (GPS) receiver capable of assisted GPS for identifying a location of the communication device 1100 based on signals generated by a constellation of GPS satellites, which can be used for facilitating location services such as navigation. The motion sensor 1118 can utilize motion sensing technology such as an accelerometer, a gyroscope, or other suitable motion sensing technology to detect motion of the communication device 1100 in three-dimensional space. The orientation sensor 1120 can utilize orientation sensing technology such as a magnetometer to detect the orientation of the communication device 1100 (north, south, west, and east, as well as combined orientations in degrees, minutes, or other suitable orientation metrics).

The communication device 1100 can use the transceiver 1102 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1106 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1100.

Other components not shown in FIG. 11 can be used in one or more embodiments of the subject disclosure. For instance, the communication device 1100 can include a reset button (not shown). The reset button can be used to reset the controller 1106 of the communication device 1100. In yet another embodiment, the communication device 1100 can also include a factory default setting button positioned, for example, below a small hole in a housing assembly of the communication device 1100 to force the communication device 1100 to re-establish factory settings. In this embodiment, a user can use a protruding object such as a pen or paper clip tip to reach into the hole and depress the default setting button. The communication device 1100 can also include a slot for adding or removing an identity module such as a Subscriber Identity Module (SIM) card. SIM cards can be used for identifying subscriber services, executing programs, storing subscriber data, and so forth.

The communication device 1100 as described herein can operate with more or less of the circuit components shown in FIG. 11. These variant embodiments can be used in one or more embodiments of the subject disclosure.

The communication device 1100 can be adapted to perform the functions of devices 111-113, the media processor 806, the media devices 808, or the portable communication devices 816 of FIG. 8, as well as the IMS CDs 901-902 and PSTN CDs 903-905 of FIG. 9. It will be appreciated that the communication device 1100 can also represent other devices that can operate in systems of FIGS. 1-6, and in communication systems 800-900 of FIGS. 8-9 such as a gaming console and a media player.

Upon reviewing the aforementioned embodiments, it would be evident to an artisan with ordinary skill in the art that said embodiments can be modified, reduced, or enhanced without departing from the scope of the claims described below. For example, devices located in residences may connect to the public network using Ethernet or MoCA (Multimedia over Coax Alliance) technologies. A subscriber may maintain an ongoing connection with the cloud storage (thus having access to the cloud storage whenever logged in to the network), and thus need to log on to "MyCloud" less frequently. A subscriber can manage the playlist (ordering additions or deletions of content items) using any device communicating with the system administrator and credentialed for the "MyCloud" service, without having to access the assigned cloud storage. In one or more embodiments, access to the cloud storage can be obtained for presentation at a display device without utilizing a STB, such as delivering to a residence that utilizes a virtualized network, a software defined network or some other network that does not utilize STBs. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 12:
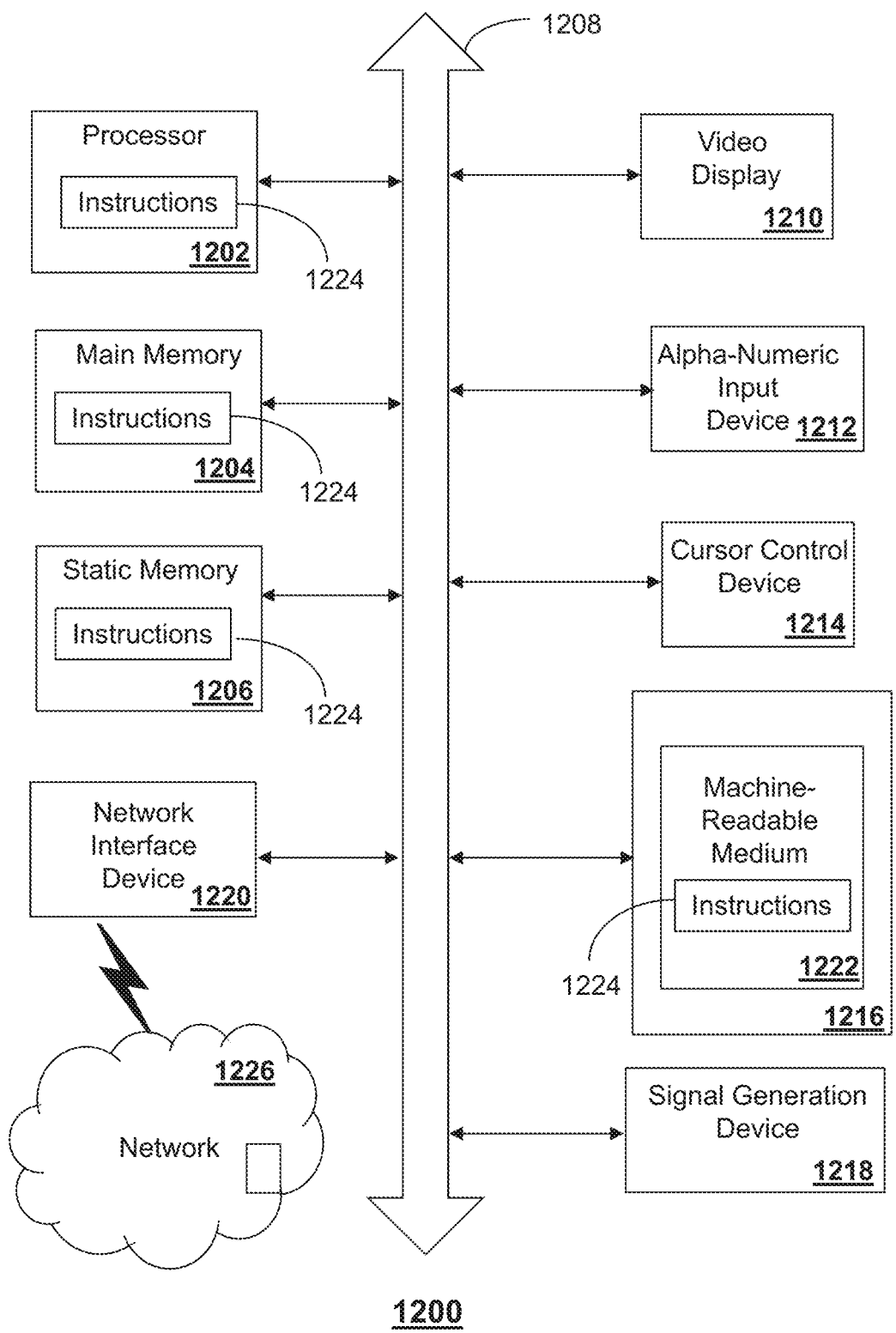
FIG. 12 is a diagrammatic representation of a machine in the form of a computer system within which a set of instructions, when executed, may cause the machine to perform any one or more of the methods described herein.

FIG. 12 depicts an exemplary diagrammatic representation of a machine in the form of a computer system 1200 within which a set of instructions, when executed, may cause the machine to perform any one or more of the methods described above. One or more instances of the machine can operate, for example, as the server 830, the media processor 806, the server 160, subscriber devices 111-113 and 620, and other devices of FIGS. 1-6. In some embodiments, the machine may be connected (e.g., using a network 1226) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1200 may include a processor (or controller) 1202 (e.g., a central processing unit (CPU)), a graphics processing unit (GPU, or both), a main memory 1204 and a static memory 1206, which communicate with each other via a bus 1208. The computer system 1200 may further include a display unit 1210 (e.g., a liquid crystal display (LCD), a flat panel, or a solid state display). The computer system 1200 may include an input device 1212 (e.g., a keyboard), a cursor control device 1214 (e.g., a mouse), a disk drive unit 1216, a signal generation device 1218 (e.g., a speaker or remote control) and a network interface device 1220. In distributed environments, the embodiments described in the subject disclosure can be adapted to utilize multiple display units 1210 controlled by two or more computer systems 1200. In this configuration, presentations described by the subject disclosure may in part be shown in a first of the display units 1210, while the remaining portion is presented in a second of the display units 1210.

The disk drive unit 1216 may include a tangible computer-readable storage medium 1222 on which is stored one or more sets of instructions (e.g., software 1224) embodying any one or more of the methods or functions described herein, including those methods illustrated above. The instructions 1224 may also reside, completely or at least partially, within the main memory 1204, the static memory 1206, and/or within the processor 1202 during execution thereof by the computer system 1200. The main memory 1204 and the processor 1202 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1222 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1200. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    providing, by a processing system including a processor coupled to a network, assigned cloud storage that is assigned to a subscriber of the network, wherein the assigned cloud storage is remote from equipment of the subscriber, the equipment of the subscriber comprising a first subscriber device and a second subscriber device;
    receiving, by the processing system, credentials from the first subscriber device to facilitate access to the assigned cloud storage by the equipment of the subscriber;
    receiving, by the processing system from the first subscriber device, identifiers of content items, wherein the content items comprise content accessible to the processing system via the network, wherein the content is stored at a storage device coupled to the processing system, stored at the equipment of the subscriber, or stored by a third-party content provider in communication with the first subscriber device;
    obtaining, by the processing system, the content items;
    storing, by the processing system, the content items in the assigned cloud storage;
    receiving, by the processing system from the second subscriber device, a request for the identifiers of the content items;
    transmitting, by the processing system, the identifiers of the content items to the second subscriber device, wherein the identifiers of the content items are displayed at the second subscriber device as a list of selectable items;
    receiving, by the processing system, a message from the second subscriber device, the message comprising a selection from the list and an instruction to initiate a download from the assigned cloud storage of a content item corresponding to the selection at a third subscriber device, wherein the assigned cloud storage is remote from the third subscriber device; and
    initiating, by the processing system, the download from the assigned cloud storage of the content item to be presented at the third subscriber device.

2. The method of claim 1, wherein the assigned cloud storage is assigned to a first subscriber, and wherein the third subscriber device is associated with a second subscriber to the network different from the first subscriber.

3. The method of claim 2, further comprising:
    obtaining, by the processing system, information regarding capabilities of the third subscriber device; and
    formatting, by the processing system, the content item to facilitate presentation of the content item at the third subscriber device.

4. The method of claim 3, wherein the processing system obtains the information in response to an alert, transmitted to the third subscriber device, that the download is to be performed.

5. The method of claim 1, wherein at least one of the content items is not presented at the equipment of the subscriber prior to storage of the at least one of the content items in the assigned cloud storage.

6. The method of claim 1, wherein the first subscriber device and the third subscriber device are remote from each other.

7. The method of claim 6, wherein the second subscriber device is a mobile device that, at a time the request is received from the second subscriber device, is remote from the first subscriber device and the third subscriber device.

8. The method of claim 1, wherein at least one of the content items is produced at the equipment of the subscriber.

9. The method of claim 1, wherein the equipment of the subscriber has access to the assigned cloud storage while in communication with the processing system over the network.

10. The method of claim 1, further comprising encrypting, by the processing system, at least one of the content items prior to storing the at least one of the content items in the assigned cloud storage.

11. A device comprising:
    a processing system including a processor; and
    a memory that stores executable instructions that, when executed by the processing system, facilitate performance of operations comprising:

providing assigned cloud storage that is assigned to a subscriber of a network, wherein the assigned cloud storage is remote from equipment of the subscriber, the equipment of the subscriber comprising a first subscriber device and a second subscriber device;

receiving, from the first subscriber device, identifiers of content items, wherein the content items comprise content accessible to the processing system via the network, wherein the content is stored at a storage device coupled to the processing system, stored at the equipment of the subscriber, or stored by a third-party content provider in communication with the first subscriber device;

obtaining the content items;

storing the content items in the assigned cloud storage;

receiving, from the second subscriber device, a request for the identifiers of the content items;

transmitting the identifiers of the content items to the second subscriber device, wherein the identifiers of the content items are displayed at the second subscriber device as a list of selectable items;

receiving a message from the second subscriber device, the message comprising a selection from the list and an instruction to initiate a download from the assigned cloud storage of a content item corresponding to the selection at a third subscriber device; and initiating the download from the assigned cloud storage of the content item to be presented at the third subscriber device, wherein the assigned cloud storage is assigned to a first subscriber, wherein the third subscriber device is associated with a second subscriber to the network different from the first subscriber, and wherein the first subscriber device and the third subscriber device are remote from each other.

12. The device of claim 11, wherein the second subscriber device is a mobile device that, at a time the request is received from the second subscriber device, is remote from the first subscriber device and the third subscriber device.

13. The device of claim 11, wherein the operations further comprise:
obtaining information regarding capabilities of the third subscriber device; and
formatting the content item to facilitate presentation of the content item at the third subscriber device.

14. The device of claim 11, wherein at least one of the content items is not presented at the equipment of the subscriber prior to storage of the at least one of the content items in the assigned cloud storage.

15. The device of claim 11, wherein the operations further comprise encrypting at least one of the content items prior to storing the at least one of the content items in the assigned cloud storage.

16. A machine-readable storage medium comprising executable instructions that, when executed by a processing system including a processor, facilitate performance of operations comprising:

providing assigned cloud storage that is assigned to a subscriber of a network, wherein the assigned cloud storage is remote from equipment of the subscriber, the equipment of the subscriber comprising a first subscriber device and a second subscriber device;

receiving, from the first subscriber device, identifiers of content items, wherein the content items comprise content accessible to the processing system via the network, wherein the content is stored at a storage device coupled to the processing system, stored at the equipment of the subscriber, or stored by a third-party content provider in communication with the first subscriber device;

obtaining the content items;

storing the content items in the assigned cloud storage;

receiving, from the second subscriber device, a request for the identifiers of the content items;

transmitting the identifiers of the content items to the second subscriber device, wherein the identifiers of the content items are displayed at the second subscriber device as a list of selectable items;

receiving a message from the second subscriber device, the message comprising a selection from the list and an instruction to initiate a download from the assigned cloud storage of a content item corresponding to the selection at a third subscriber device; and initiating the download from the assigned cloud storage of the content item to be presented at the third subscriber device.

17. The machine-readable medium of claim 16, wherein the assigned cloud storage is assigned to a first subscriber, and wherein the third subscriber device is associated with a second subscriber to the network different from the first subscriber.

18. The machine-readable medium of claim 17, wherein the operations further comprise:
obtaining information regarding capabilities of the third subscriber device; and
formatting the content item to facilitate presentation of the content item at the third subscriber device.

19. The machine-readable medium of claim 16, wherein the first subscriber device and the third subscriber device are remote from each other.

20. The machine-readable medium of claim 19, wherein the second subscriber device is a mobile device that, at a time the request is received from the second subscriber device, is remote from the first subscriber device and the third subscriber device.

* * * * *

UNITED STATES PATENT AND TRADEMARK OFFICE
CERTIFICATE OF CORRECTION

PATENT NO. : 10,839,092 B2  
APPLICATION NO. : 15/896836  
DATED : November 17, 2020  
INVENTOR(S) : Ludwin Guillen Page 1 of 1

It is certified that error appears in the above-identified patent and that said Letters Patent is hereby corrected as shown below:

In the Claims

Claim 16, Column 20, Line 1, delete "A machine readable storage medium comprising" and insert -- A machine readable medium comprising --

Signed and Sealed this  
Eighth Day of February, 2022

Drew Hirshfeld  
*Performing the Functions and Duties of the  
Under Secretary of Commerce for Intellectual Property and  
Director of the United States Patent and Trademark Office*